United States Patent [19]

Bolam

[11] Patent Number: 5,028,071

[45] Date of Patent: Jul. 2, 1991

[54] CONNECTOR ASSEMBLY FOR DECORATIVE TUBULAR MEMBERS

[75] Inventor: Ralph Bolam, West Covina, Calif.

[73] Assignee: Mercury Tube Industries, Duarte, Calif.

[21] Appl. No.: 470,223

[22] Filed: Jan. 25, 1990

[51] Int. Cl.⁵ .............................................. B60R 21/13
[52] U.S. Cl. ...................................... 280/756; 403/84; 296/205
[58] Field of Search ..................... 280/756; 403/83, 84; 296/205

[56] References Cited

U.S. PATENT DOCUMENTS

| 4,148,504 | 4/1979 | Rushing | 280/756 |
| 4,786,097 | 11/1988 | Browning et al. | 280/756 |
| 4,900,058 | 2/1990 | Hobrecht | 280/756 |

FOREIGN PATENT DOCUMENTS 26891 11/1910 United Kingdom ................. 403/84

Primary Examiner—Kenneth R. Rice
Attorney, Agent, or Firm—Beehler & Pavitt

[57] ABSTRACT

Apparatus for connecting two tubes in a T-shape which permits the tube which is extended perpendicular from the middle of the other tube to be adjusted to a certain degree about the circumference of the other tube before the tubes are secured to one another.

11 Claims, 2 Drawing Sheets

CONNECTOR ASSEMBLY FOR DECORATIVE TUBULAR MEMBERS

FIELD OF THE INVENTION

The present invention relates to a connector assembly for tubular members and more particularly to an improved connector assembly for tubular members used as decorative elements for mounting on beds of open backed trucks.

DESCRIPTION OF THE PRIOR ART

It is not uncommon for owners of open backed vehicles such as open back trucks to install tubular decorative bars, for example, on the bed of the truck and to the rear of the passenger cab. Typically one or more decorative tubular elements are bolted to the open backed bed of the truck, extend above the truck bed to about the height of the cab and extend transversely across the bed of the truck from one side edge of the truck bed to the other. Normally such decorative bar assemblies also include spaced tubular bars which are mounted on the transverse bar(s) and extend axially along the back and along each side of the truck.

One end of the axially extending tubular member is affixed at an angle to the transverse bar and slopes downwardly from the transverse bar towards the rear of the truck bed and the other end is normally bolted to the truck bed. It is not unusual to mount lights or other items on the transverse portion of the decorative bar structure. The decorative bars are generally tubular in cross-section and normally are chromed for attractive appearance.

It is also the case that these decorative bar assemblies are fabricated into sets, a kit so-called, depending upon the type of truck and are most frequently installed by the user. While the kits are intended to fit the various types and styles of trucks, sometimes due to manufacturing or condition of the truck itself, the axially extending side tube sections do not mount properly to the transverse section or to the floor or bed of the truck.

While these tubular members are not structural roll-over bars, they are of such a structure that they are not easily bent, as may be needed if there are installation problems. Since the principal function of these decorative roll-over bars is enhancement of the appearance of the vehicle, improperly fitting parts tend to distract from the very purpose for which they are most often used, i.e., to enhance the attractiveness of the vehicle itself.

Heretofore, it was known to provide the transverse tubular member with pre-drilled holes in the region where the transverse and axially extending bars were to be joined. A threaded bolt passed through the transverse bar and was used to bolt the axial bar in place. One end of the axial bar was provided with a foot with pre-drilled holes for mounting on the bed of the truck. The other end of the axial bar, i.e., the end which mounts to the transverse bar, was contoured so that it fit with the contour of the transverse bar, the orientation being such that the axial bar is at an angle, normally a right angle plane, with respect to the transverse bar. The contouring essentially involved shaping the end of the axial bar such that it mated with the opposing curved surface of the transverse bar.

On the interior of the shaped hollow end of the axially extending tubular element, a flat planar cross-piece was affixed, as by welding to the interior of the axially extending tubular element such that the latter extended across the diameter of the open end of the axial member, but recessed sufficiently to allow the axial member to fit snugly against the transverse member. This planar cross-piece was provided with a nut which mated with the bolt. The location of the nut was fixed so that the installation involved aligning the axial member to the region of the transverse member through which the bolt passed and then tilting the contoured end of the axial member until the threaded end of the bolt could be threaded into the nut.

Since the orientation of the bolt is fixed, depending on the angle of the bolt as controlled by the line of sight bolt openings in the transverse member, proper alignment and installation also required that the nut be properly oriented to mate with the bolt. Like the bolt, the orientation of the nut was also fixed. If there was a mismatch, it became difficult to assemble the axial member to the transverse member.

If there was a mismatch, it was necessary to move the mounting end of the axial member through an arc until mating was achieved. To move the axial member through an arc, typically the entire axial member was rotated, i.e., the other end of axial member or that which bolted to the bed of the truck had to be lowered or raised. If matching required a lifting of the end of the axial member, there was no major problem. However, if matching required lowering the end of the axial member, the truck bed created interference which limited the downward movement of the end of the axial member to achieve a match to permit the connection to be made.

A mismatch could arise for several reasons including unevenness of the truck bed or simply non-matching due to manufacturing problems such as worn or misaligned tooling.

Thus, there is a need for an improved connection assembly which allows the axially aligned tubular member to be adjustably and arcuately rotated about the transverse tubular member to achieve the required rotational or arcuate angle, according to the fixation points, just prior to securing the connection of the two tubular members.

It is thus an object of this invention to provide an improved and relatively simple connecting assembly for transverse and axial tubular members such that there is ample adjustment available in either direction of the axial member in order to achieve assembly thereof to the transverse member.

Another object of this invention is to provide a relatively simple structure for quick and easy connection of a tubular member to a transverse tubular member such that the arcuate angle of the axial member about the transverse member may be easily adjusted so as to allow proper assembly of the two members while permitting the end of the axial member to be securely fixed to a support structure.

Still another object of this invention is to provide a decorative bar structure for mounting on the bed of a vehicle, such as an open bed truck, and which includes at least one transverse tubular member and at least one axially extending tubular member wherein an improved interconnection assembly is provided to assure some adjustment of the axial member with respect to the transverse member in order to compensate for misalignment of the parts to be interconnected.

Still another object of this invention is to provide an improved connecting assembly whose manufactured parts are not significantly more complicated or costly than existing connecting assemblies.

SUMMARY OF THE INVENTION

These and other objects of the present invention are achieved through the use of a tubular transverse member which is preferably pre-drilled to provide an opening through which a threaded fastener extends at a predetermined angle. At least one tubular axially extending member is provided which includes one end having a contour which basically matches that of the transverse member at the mounting region and another end which is adapted to be mounted on the support surface, typically the bed of the open backed vehicle. Typically, there are two spaced axial members mounted in spaced relation to each other along the side of the vehicle.

To permit arcuate adjustment of the axial members relative to the transverse member, the contoured end of the axial member is provided with a carrier which is fixed to the interior thereof, the latter being generally arcuate, and which supports a movable carrier. The carrier, in turn supports a threaded member which mates with the threaded member on the transverse tubular element. In this way, the axial member may be arcuately adjusted relative to the transverse member so that the threaded members mate and the other end of the axial member may be fixed to its support structure. If arcuate movement is needed, it is provided for by the arcuately movable threaded member carried by the carrier. Once adjusted and fixed to the support, the other end of the axial member may be securely fastened to the transverse member.

Thus, the improved connector assembly in accordance with this invention is relatively simple to manufacture and relatively simple to install which providing the advantage of compensating for any mismatch of the types described.

DETAILED DESCRIPTION OF THE DRAWINGS

DESCRIPTION OF THE PREFERRED EMBODIMENT

Figure 1:
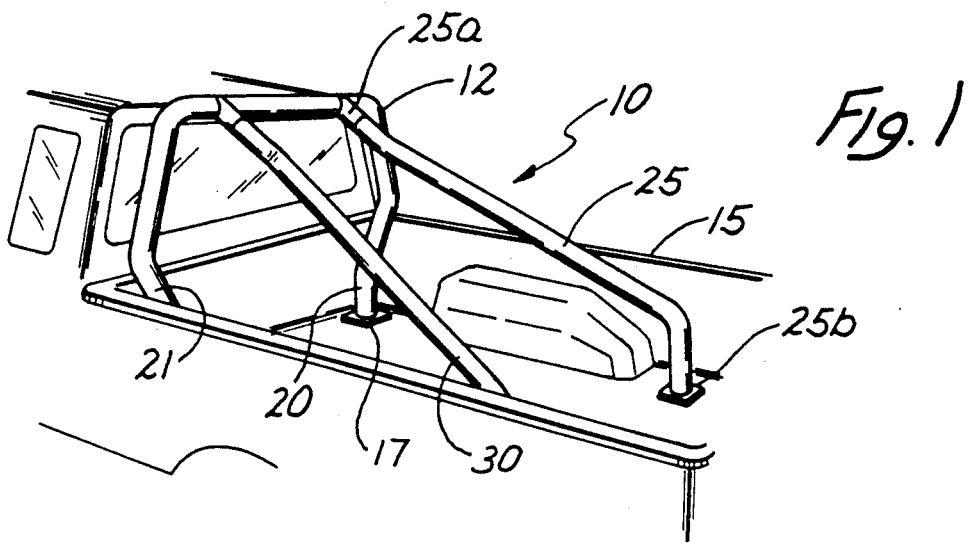
FIG. 1 is a view in perspective illustrating a typical tubular assembly in accordance with the present invention, in the form of a decorative bar for a vehicle.

Referring to the drawings which illustrate a preferred form of the present invention, FIG. 1 is a diagrammatic view of the tubular assembly 10 in accordance with this invention. As illustrated, the tubular assembly 10 includes at least one transversely positioned tubular element 12, the latter located to the rear of the passenger section 14 of the vehicle 15. The transverse element is mounted on the bed 17 of the rear of the truck and extends from one side to the other of the truck bed. It is recognized that the configuration of the transverse member may be any one of several possible configurations and that the member shown is for purposes of illustration. Further, the tubular assembly is illustrated as mounted on a vehicle body for purposes of illustration only.

As shown, the legs 20, 21 of the transverse member are also tubular and are bolted or otherwise affixed to the bed 17. The transverse member 12 may carry lights or other items 24 and the height of the transverse element 12 is such that it is about equal to the top of the passenger section 14. It is understood that the tubular assembly is a decorative unit and is not intended to be a structural roll-over bar assembly.

Cooperating with the transverse tubular element 12 are a pair of spaced axially oriented elements 25 and 30. The term axial is intended to be a relative orientation with respect to a vehicle axis, again for purposes of illustration. Each of the axial tubular elements is of essentially the same general configuration and includes one end 25a and 30a which is affixed to the transverse element 12 and another end 25b and 30b (not visible) which is affixed to the bed.

The transverse member 12 and the axial members 25 and 30 usually come in a kit form dimensioned for each type of vehicle size and of different decorative combinations and are assembled to the support structure, in this case an open bed truck, by the user. Typically, the tubular elements are tubular steel elements, which may be chrome or painted finished, and of a generally circular cross-section. Other cross-sectional shapes may be used and generally include a curved or arcuate surface portion at the connection between the axial and transverse members. As shown, the plane of the axial members is in a perpendicular relation with the plane of the transverse member.

Figure 3:
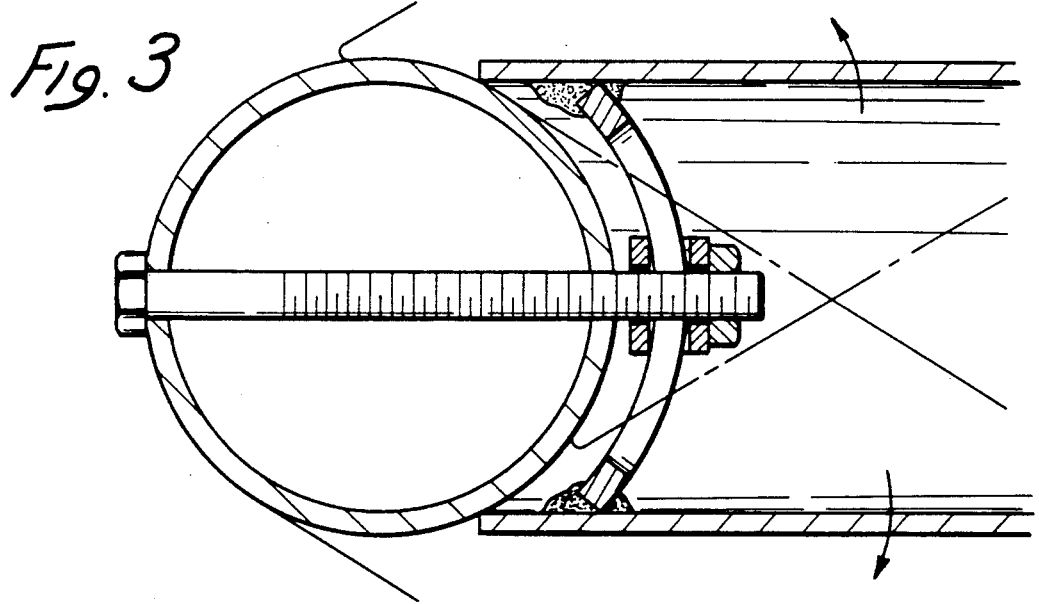
FIG. 3 is a view, partly in section and partly in elevation, of the tubular assembly in accordance with this invention.
Figure 2:
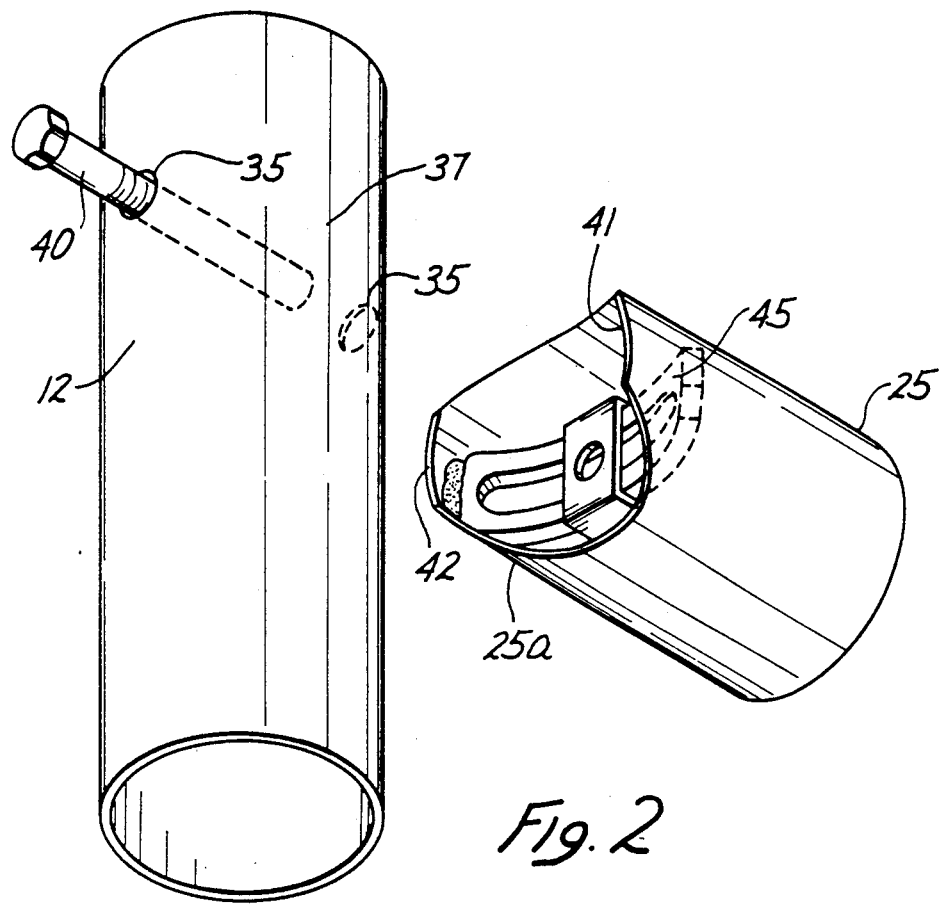
FIG. 2 is a developed view of the tubular assembly in accordance with this invention.
Figure 4:
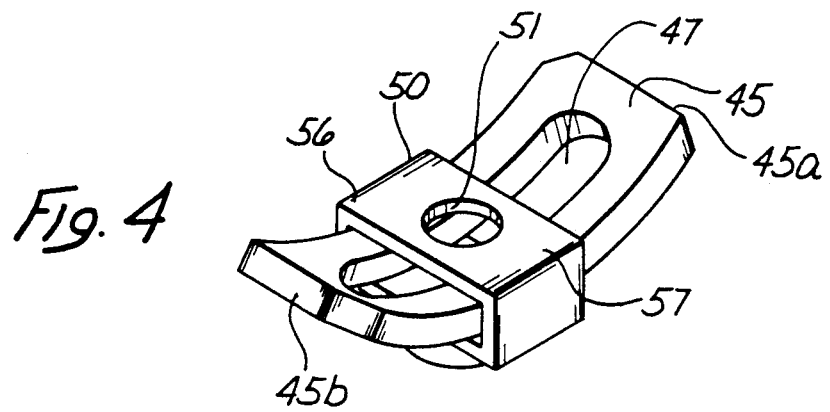
FIG. 4 is view in perspective of the carrier and threaded element in accordance with this invention.

For example, as seen in FIGS. 2 and 3, the interconnection between the axial members 25 and 30 and the transverse member 12 is basically the same. The transverse member includes pre-drilled apertures 35 in a predetermined orientation depending on the factory set angular connection with the axial member, 25, for purposes of explanation. The portion of the surface between the apertures generally includes a curved surface portion 37, as shown. Received in the apertures 35 is a threaded fastener 40, in the form of a bolt, the latter having a length sufficient to extend some distance through element 12, as will be described.

Figure 5:
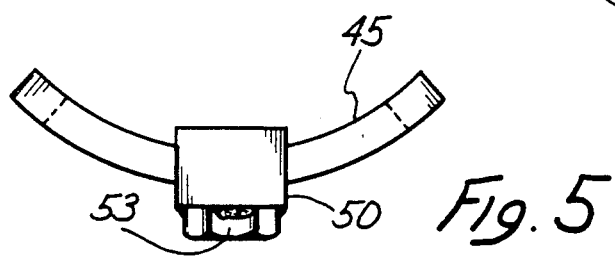
FIG. 5 is a side view of the carrier and threaded element in accordance with this invention.

The end 25a of the member 25 is configured to follow and mate with the contour of the surface portion 37, as shown. The result is that two spaced ears 41 and 42 are formed. The end 25a of member 25 includes a carrier 45 which is arcuate in shape, see also FIG. 5, the arc following generally the arc of the curved surface portion 37. The carrier also is slotted as at 47, but not slotted all the length, for ease of mounting in the tubular element 25. Mounted on the carrier 45 is a slidable fastener element 50 which ultimately mates with threaded fastener 40 to join the two parts together securely.

In a preferred form, the slidable fastener includes a locator hole 51 on one side and which is not threaded and which is of a diameter slightly larger than the diameter of the fastener 40. On the side opposite the locator hole 51 and in alignment therewith and carried on the carrier is a threaded member 53 which mates with member 40. The slidable fastener includes side walls 56 and 57 through which the carrier passes so that there is a guiding movement.

As seen in FIGS. 2 and 3, the carrier is fixed to the interior of the tubular element 25 at end 25a and recessed back from the open end thereof. In effect, each leg 45a and 45b is aligned with an ear 41 and 42. The carrier is oriented such that the locator hole 51 faces toward the open end, i.e., towards the transverse member, while the threaded member is facing the interior of the member 25, i.e., away from the transverse member. In assembly, the slidable fastener 50 is slipped over the carrier, correctly oriented as described and the carrier is then affixed to the interior of the end 25a of the tubular element as by welding and the like. Since the carrier is slightly spaced from the open end and the legs thereof are aligned with the ears, this is a relatively simple assembly and manufacturing operation.

In assembling the transverse and axial members together, the transverse member 12 is first mounted to the support structure. Thereafter, one of the axial member 25 or 30 is mounted on the transverse member by locating the end of threaded member 40 in the locator hole 51 and threading enough of that member into the slidable member 50 to mate with the threads on threaded element 53. The other end of the axial member is then assembled to the support structure. This is followed by tightening fastener 40. If the alignment is ideal in the sense that the end 25b or 30b of the axial members are properly positioned on the support structure, then the slidable threaded element 50 should be located at about the mid-point of the carrier.

The advantage of this invention now becomes clear in that instance in which the alignment is not ideal, i.e., the end 25b or 30b of the axial member is not properly seated on the support structure. If there is improper seating, the axial member may be moved arcuately relative to the transverse member to achieve proper seating. This is possible in accordance with this invention since the slidable fastener 50 is movable along the carrier, from one interior wall portion to the other of the interior of the axial member. The position of threaded fastener 40 is fixed by the orientation of the apertures 35, thus, it is not free to move arcuately.

The outer tubular element 25 or 30, however, is arcuately movable relative to the fastener 40 by virtue of the effectively arcuate movement of the slidable fastener element 50 on the arcuate carrier 45. This arcuate movement is illustrated in the phantom lines in FIG. 3. It is for this reason that the length of the fastener 40 should be sufficient to engage the threaded portion 53 of the slidable carrier 45 and why the slidable carrier is of an arcuate configuration generally following the contour of the transverse element. The effect is adjustment in an arcuate manner on each side of a center line which is the center axis of the threaded element 40. Such adjustment is sufficient to permit proper installation and to compensate for irregularity of the support surface or misalignment due to manufacturing or both.

It is apparent from the foregoing detailed description that an improved connector assembly is provided. It will also be apparent that various modifications thereof may be made without departing from the invention as set forth in the appended claims.

What is claimed is:

1. An improved decorative bar assembly for use on a vehicle and which includes at least one transverse tubular member having an outer curved surface portion and adapted to be affixed to the vehicle and to the rear of the passenger and extending transversely across the vehicle and which includes at least one axially extending tubular member adapted to be connected at one end to the transverse member and at the other end to the vehicle at a location axially remote from the transverse member, wherein the improvement comprises:
   said transverse tubular member having at least one pre-drilled aperture therein,
   threaded fastener means received in said aperture and including a threaded portion which extends beyond the outer curved surface portion thereof,
   one end of said axial member being configured to match the contour of said transverse member and the other end being adapted to be secured to the vehicle,
   carrier means fixed to the interior of said one end of said tubular member and spaced from said open end thereof and extending from one interior wall portion thereof to the other interior wall portion thereof,
   said carrier means including a threaded fastener which is slidable thereon between said interior wall portions and which is adapted to mate with the threaded fastener in said aperture, and
   said threaded fastener means received in said aperture being of a length sufficient to mate with and to be received in said slidable fastener whereby the axial member may be adjusted arcuately such that the other end thereof may be affixed to the vehicle.

2. An improved decorative bar assembly for use on a vehicle as set forth in claim 1 wherein said carrier means is curved.

3. An improved decorative bar assembly for use on a vehicle as set forth in claim 1 wherein said carrier means includes a slot therein, and
   the threaded fastener on said carrier means including means forming a locator aperture for guiding said threaded fastener means.

4. An improved decorative bar assembly for use on a vehicle as set forth in claim 1 wherein said transverse tubular member includes at least two pre-drilled apertures therein.

5. An improved decorative bar assembly for use on a vehicle as set forth in claim 1 wherein said transverse tubular member is cylindrical and wherein the one end of said axial member is configured to match the cylindrical contour of said transverse member.

6. An improved decorative bar assembly for use on a vehicle as set forth in claim 5 wherein said carrier means is curved to follow the cylindrical contour of said transverse member.

7. An improved decorative bar assembly for use on a vehicle as set forth in claim 1 wherein said carrier means is affixed to the interior of said one tubular member by a weldment.

8. An improved decorative bar assembly for use on a vehicle as set forth in claim 1 wherein said carrier means is curved and includes a slot, said threaded fastener including an aperture therein aligned with said slot.

9. An improved decorative bar assembly for use on a vehicle as set forth in claim 8 wherein said carrier means is curved.

10. An improved adjustable tubular assembly for mounting on a support surface, comprising:
    at least one transverse tubular member having an outer curved surface portion and adapted to be affixed to a support surface and extending transversely in a predetermined direction,
    at least one axially extending tubular member adapted to be connected at one end to the transverse member and at the other end to a support surface at a location axially remote from the transverse member, said transverse tubular member having at least one pre-drilled aperture therein, threaded fastener means received in said aperture and including a threaded portion which extends beyond the outer curved surface portion thereof, one end of said axial member being configured to match the contour of said transverse member and the other end being adapted to be secured to a support surface, carrier means fixed to the interior of said one end of said tubular member and spaced from said open end thereof and extending from one interior wall portion thereof to the other interior wall portion thereof, said carrier means having a curvature similar to the contour of said of the outer curved surface portion of said transverse member and including a threaded fastener which is slidable thereon between said interior wall portions and which is adapted to mate with the threaded fastener in said aperture, said carrier means including means forming a slot extending at least partially between said interior walls and said threaded fastener slidable thereon including a pilot hole adjacent said one end of said axial tubular member and a threaded member on the side of said carrier opposite said one of said axial tubular member, and said threaded fastener means received in said aperture being of a length sufficient to mate with and to be received in said slidable faster whereby the axial member may be adjusted arcuately such that the other end thereof may be afixed to a support surface.

11. An improved adjustable decorative tubular assembly for mounting on a support surface of a vehicle which support surface is located to the rear of the passenger compartment, comprising:

first hollow tubular means having an outer curved surface portion, second hollow tubular means adapted to be connected at one end to said first hollow tubular means, the end of said second hollow tubular means adapted to be connected to said first hollow tubular means being configured to match the contour of said outer curved surface of said first hollow tubular means, said first hollow tubular means having at least one pre-drilled aperture through at least one wall thereof, first fastener means fixed with respect to said aperture and including a threaded portion adapted to mate with the threaded portion of a mating second fastener means, carrier means mounted on the interior of said second hollow tubular means and extending from one interior wall portion thereof to an opposing interior wall portion and being in spaced relation to the end thereof which is connected to said first hollow tubular means, said carrier means being a curved configuration following the curvature of said outer curved surface portion and including slot means, second mating fastener means including a portion which extends through said slot means and which mates with said first fastener means to secure said first and second hollow tubular means together, and said second mating fastener being of a length sufficient such that a portion passes through said slot means whereby there is relative angular adjustment between said first and second hollow tubular means.

* * * * *